United States Patent
Hunter et al.

(10) Patent No.: US 8,433,302 B2
(45) Date of Patent: Apr. 30, 2013

(54) SYSTEM AND METHOD FOR DOWNLOADING AND ACTIVATING THEMES ON A WIRELESSS DEVICE

(75) Inventors: Kevin Edward Hunter, Del Mar, CA (US); Brian Vogelsang, La Mesa, CA (US); Sital Amin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/127,225

(22) Filed: May 27, 2008

(65) Prior Publication Data

US 2008/0300908 A1 Dec. 4, 2008

Related U.S. Application Data

(60) Provisional application No. 60/941,257, filed on May 31, 2007.

(51) Int. Cl.
*H04L 29/06* (2006.01)
(52) U.S. Cl.
USPC ........ 455/414.3; 455/415; 455/411; 455/566; 455/39; 715/747
(58) Field of Classification Search .................... 455/39, 455/411, 414.1–417, 566; 715/747
See application file for complete search history.

(56) References Cited

U.S. PATENT DOCUMENTS

| | | | |
|---|---|---|---|
| 5,905,492 A * | 5/1999 | Straub et al. .................. | 715/744 |
| 6,091,411 A * | 7/2000 | Straub et al. .................. | 715/747 |
| 7,113,772 B2 | 9/2006 | Chmaytelli et al. | |
| 7,120,429 B2 | 10/2006 | Minear et al. | |
| 7,571,189 B2 * | 8/2009 | Levin et al. .......................... | 1/1 |
| 7,844,658 B2 * | 11/2010 | Woundy et al. ............... | 709/200 |
| 8,050,242 B2 * | 11/2011 | Lipford et al. ................ | 370/338 |
| 2002/0197983 A1 | 12/2002 | Chubb et al. | |
| 2003/0167230 A1 * | 9/2003 | McCarthy ....................... | 705/40 |
| 2004/0088371 A1 * | 5/2004 | Hiramatsu et al. ............ | 709/217 |
| 2005/0050474 A1 | 3/2005 | Bells et al. | |
| 2005/0108707 A1 * | 5/2005 | Taylor et al. .................. | 717/177 |
| 2006/0059430 A1 * | 3/2006 | Bells et al. .................... | 715/747 |
| 2006/0161635 A1 | 7/2006 | Lamkin et al. | |

(Continued)

FOREIGN PATENT DOCUMENTS

| | | |
|---|---|---|
| CN | 1650597 A | 8/2005 |
| CN | 1747582 A | 3/2006 |

(Continued)

OTHER PUBLICATIONS

International Search Report—PCT/US08/065418, International Search Authority—European Paten Office, Sep. 12, 2008.

(Continued)

*Primary Examiner* — Edward Urban
*Assistant Examiner* — Rui Hu
(74) *Attorney, Agent, or Firm* — Nicholas A. Cole

(57) ABSTRACT

A wireless device receives a list of available themes and premium content from an activation server. The wireless device may select a theme for download and activation. The activation server verifies that the wireless device has access to the theme or premium content and then authorizes the wireless device to activate the theme or premium content. If the theme or premium content is not resident on the wireless device, the activation server may transmit the theme or premium content to the wireless device.

54 Claims, 7 Drawing Sheets

U.S. PATENT DOCUMENTS

| | | | |
|---|---|---|---|
| 2006/0173911 A1* | 8/2006 | Levin et al. | 707/104.1 |
| 2006/0206590 A1* | 9/2006 | Wakasa et al. | 709/219 |
| 2007/0073697 A1* | 3/2007 | Woods | 707/9 |
| 2007/0118533 A1 | 5/2007 | Ramer et al. | |
| 2007/0232292 A1* | 10/2007 | Larocca | 455/425 |
| 2008/0010361 A1 | 1/2008 | Jacobs et al. | |
| 2008/0028326 A1* | 1/2008 | Wilson et al. | 715/762 |
| 2008/0082926 A1* | 4/2008 | Reponen | 715/744 |
| 2008/0182628 A1* | 7/2008 | Lee et al. | 455/566 |
| 2008/0192714 A1* | 8/2008 | Kim et al. | 370/338 |
| 2008/0214147 A1* | 9/2008 | Kim et al. | 455/414.1 |
| 2008/0293387 A1* | 11/2008 | Conn et al. | 455/414.1 |
| 2009/0319711 A1* | 12/2009 | Knowles et al. | 710/240 |
| 2010/0151847 A1* | 6/2010 | Wilson et al. | 455/418 |
| 2010/0169357 A1* | 7/2010 | Ingrassia et al. | 707/769 |

FOREIGN PATENT DOCUMENTS

| | | |
|---|---|---|
| CN | 1758794 A | 4/2006 |
| CN | 1867886 A | 11/2006 |
| JP | 2003005883 A | 1/2003 |
| JP | 2003196200 A | 7/2003 |
| JP | 2005005901 A | 1/2005 |

OTHER PUBLICATIONS

Written Opinion—PCT/US08/065418, International Search Authority—European Patent Office, Sep. 12, 2008.

* cited by examiner

SYSTEM AND METHOD FOR DOWNLOADING AND ACTIVATING THEMES ON A WIRELESSS DEVICE

The present Application for Patent claims priority to Provisional Application No. 60/941,257 entitled "System and Method for Downloading and Activating Themes on a Wireless Device" filed May 31, 2007, and assigned to the assignee hereof and hereby expressly incorporated by reference herein.

FIELD

The present invention generally relates to wireless devices and, more particularly, to the downloading and activation of themes on wireless devices.

DESCRIPTION OF THE RELATED ART

Wireless devices are becoming more and more sophisticated. The latest wireless devices are capable of displaying high resolution images, playing music and video, rendering three-dimensional graphics, and more. In order to take advantage of these new capabilities, new user interfaces need to be developed to create an enhanced user experience.

SUMMARY OF THE INVENTION

In one aspect of the present disclosure, a method of activating theme box data on a wireless device is disclosed. The method includes activating a theme box at the wireless device and receiving a list of available theme box data at the theme box. Further, the method includes selecting the theme box data for activation from the list of available theme box data and transmitting an activation request to activate the theme box data. The method can also include receiving an authorization to activate the theme box data and activating the theme box data on the wireless device.

In another aspect, a wireless device is disclosed and includes means for activating a theme box at the wireless device, means for receiving a list of available theme box data at the theme box, means for selecting the theme box data for activation from the list of available theme box data, means for transmitting an activation request to activate the theme box data, means for receiving an authorization to activate the theme box data, and means for activating the theme box data on the wireless device.

In yet another aspect, a computer program product is disclosed and includes a computer readable medium. The computer readable medium includes at least one instruction for activating a theme box at the wireless device, at least one instruction for receiving a list of available theme box data at the theme box, at least one instruction for selecting the theme box data for activation from the list of available theme box data, at least one instruction for transmitting an activation request to activate the theme box data, at least one instruction for receiving an authorization to activate the theme box data, and at least one instruction for activating the theme box data on the wireless device.

In still another aspect of the present disclosure, a method of processing theme box data on a server is disclosed and includes receiving an indication that a theme box is activated at a wireless device and transmitting a list of available theme box data. Moreover, the method includes receiving an activation request to activate the theme box data, performing a validation check on the activation request, and transmitting an authorization to activate the theme box data.

In another aspect, a server is disclosed and includes means for receiving an indication that a theme box is activated at a wireless device, means for transmitting a list of available theme box data, means for receiving an activation request to activate the theme box data, means for performing a validation check on the activation request, and means for transmitting an authorization to activate the theme box data.

In yet still another aspect, a computer program product is disclosed and includes a computer readable medium. The computer-readable medium can include at least one instruction for receiving an indication that a theme box is activated at a wireless device, at least one instruction for transmitting a list of available theme box data, at least one instruction for receiving an activation request to activate the theme box data, at least one instruction for performing a validation check on the activation request, and at least one instruction for transmitting an authorization to activate the theme box data.

Additional embodiments will be apparent in the foregoing description and equivalents thereof.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any embodiment described herein as "exemplary" is not necessarily to be construed as preferred or advantageous over other embodiments.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communications device," and "wireless handset" are used interchangeably. A wireless device could be a cellular telephone, a pager, a PDA, a smartphone, a navigation device, or a computer with a wireless connection.

Themes are at least comprised of assets. Optionally, themes may be comprised of both assets and layout information. A theme's assets could be any one of the following: music, images, video, other multimedia data, or a combination thereof. For instance, a theme based on a rock band could contain images of band members, tour dates, songs, or any combination thereof.

Figure 4:
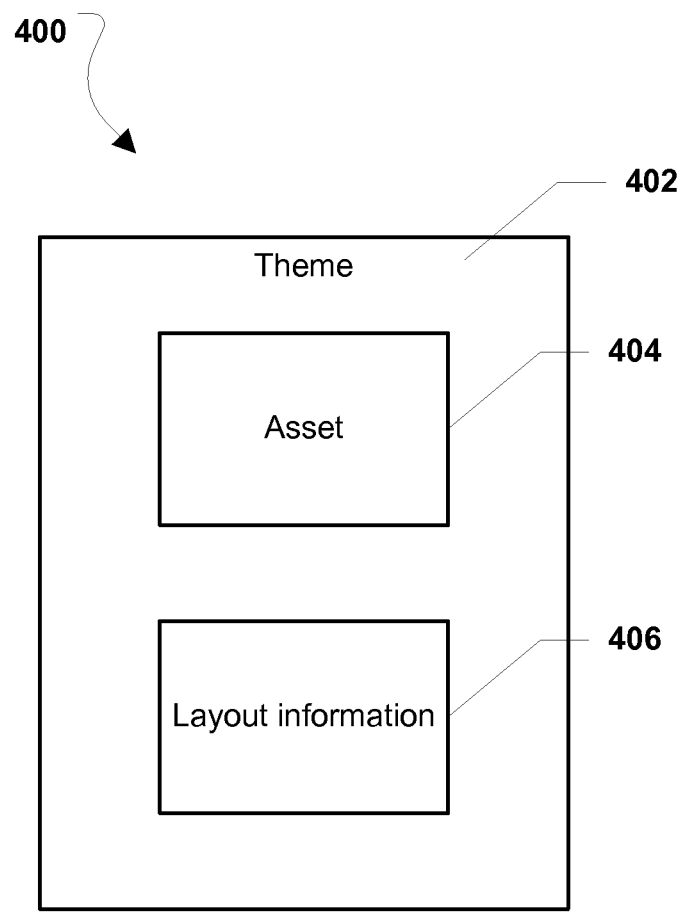
FIG. 4 is a block diagram depicting a theme.
Figure 5:
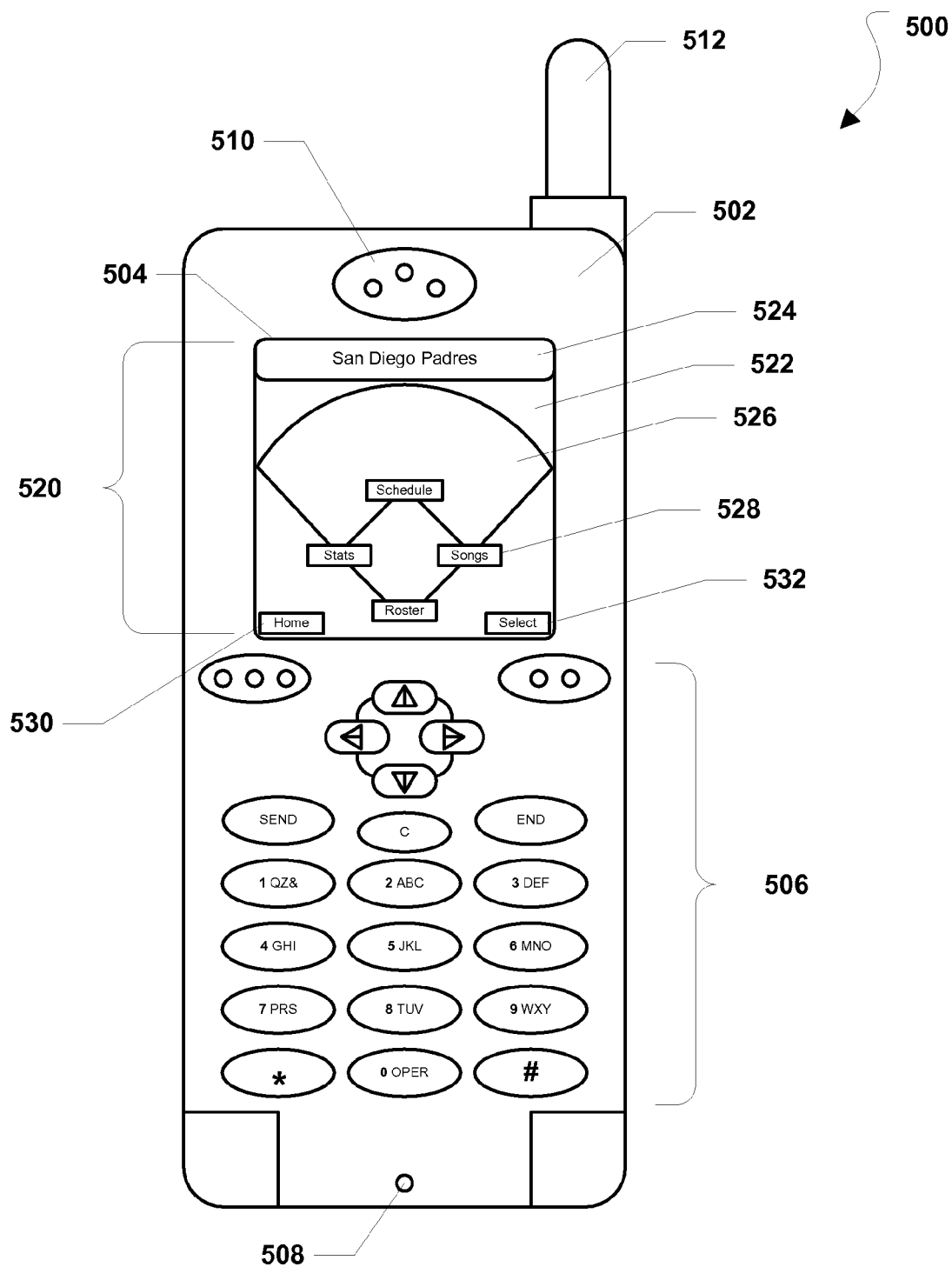
FIG. 5 is a plan view of a wireless device depicting an aspect of an exemplary theme.
Figure 6:
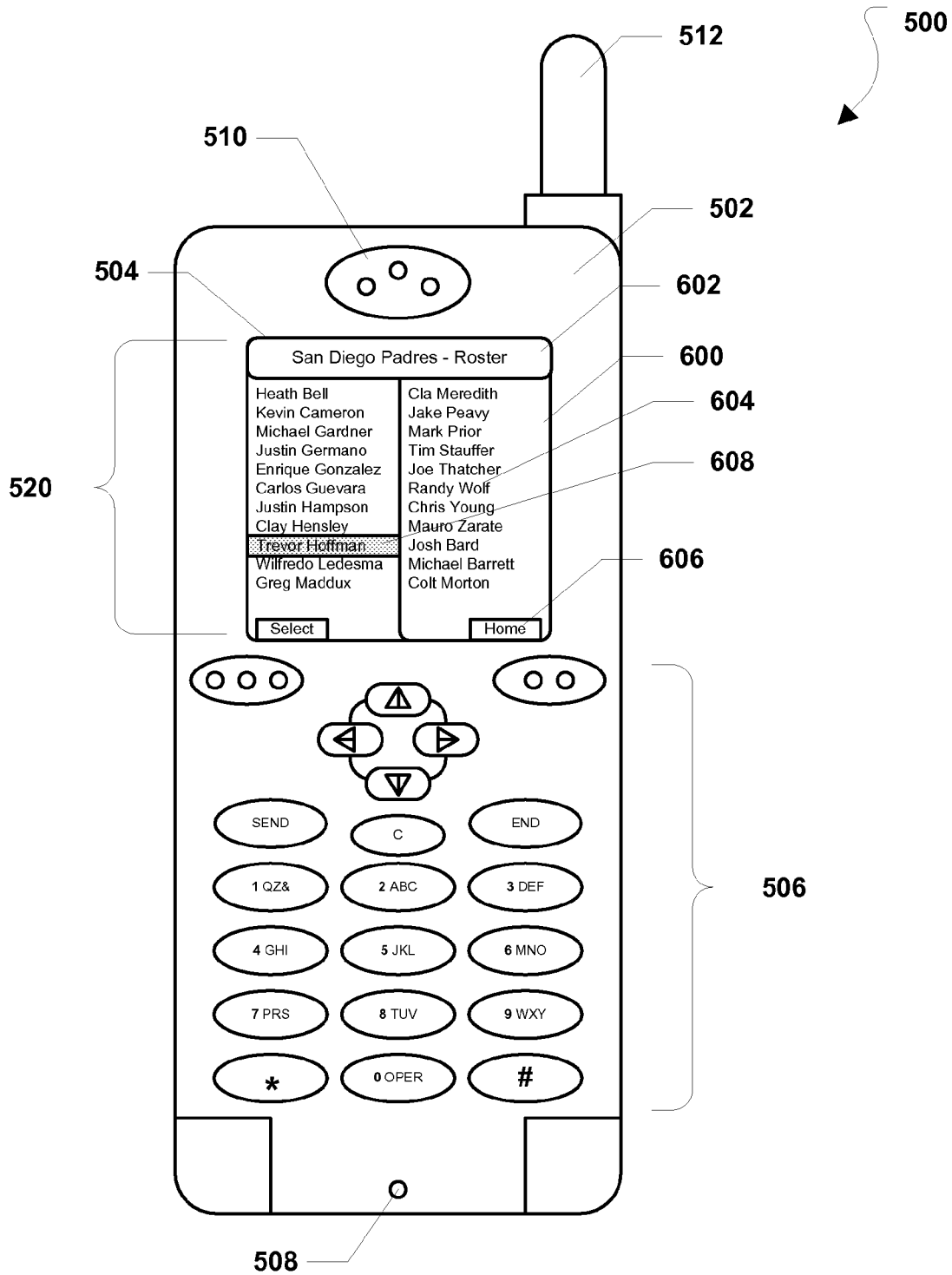
FIG. 6 is another plan view of the wireless device depicting another aspect of the exemplary theme.

In a particular aspect, themes can differ from content (e.g., ringtones, wallpapers, video, and music). A theme can represent a relationship between one or more assets and the look and feel of a user interface. While a theme can include content, the theme is not limited to the content because the theme can further include user interface layout information in addition to the content. Accordingly, themes can be applied to a wireless device in order to change the look and feel of the user interface by applying content to various aspects of the user interface using the theme's layout information. FIG. 4 through FIG. 6, described in detail below, illustrate an exemplary, non-limiting aspect of a theme. Specifically, FIG. 4 through FIG. 6 illustrate a baseball related theme.

Layout information may be optionally contained in a theme. Layout information describes the presentation of the assets on the wireless device. If layout information is not present within the theme, the wireless device may use existing layout information to define the presentation of assets. In one aspect, layout information may be bundled within a theme and dictate that a particular image (i.e. an asset) be used as the background image and should cover the entire background area of the display. In another aspect, the layout information may arrange a series of images in a menu.

As part of describing the presentation of the assets, layout information may further define actions to be taken in response to user interaction. In one aspect, layout information could define an action to be taken when a menu item is selected e.g. selecting the address book icon will open the wireless device's address book. Layout information is not limited to visual aspects and could easily describe the presentation of non-visual assets (such as sounds). In one aspect, layout information could dictate that a clicking sound, or some other sound, be played when the user navigates through a list of pictures or other items.

Layout information can customize the user interface in order to make specific functionality of the device more accessible. In one aspect, a wireless device may have a music player feature which can play MPEG-3 songs. However, the music player may require multiple user actions in order to access the music player i.e. the user would have to click through several menus and submenus to actually access the music player. A user who is particularly interested in listening to music on their wireless device may find multiple clicks to be frustrating. A theme could solve this problem by making the music player directly accessible from the homescreen of the wireless device, thus allowing one-click access to the music player and reducing user frustration. In alternative aspects, a theme could make any feature of the wireless device more accessible to the user. For instance, a theme could provide instant navigation to a picture album, an address book, a video conferencing application, an email client, a web browser, a game, stock quotes, sports scores, or any other feature commonly available on wireless devices.

Assets and layout information can complement each other within the theme in order to provide a consistent and pleasing user experience. In one aspect, the theme's assets could be applied to several of the user interface elements using layout information such that the entire look and feel of the wireless device shares the same subject matter. In one aspect, the theme could contain assets which relate to a particular sport, e.g., baseball, football, basketball, auto racing, soccer, boxing, mixed martial arts, hockey, etc. For example, a theme can contain assets that related to a baseball team, which, for convenience, will be referred to as the baseball theme. Specifically, the baseball theme's assets could be images of players, team songs, player statistics, dates of upcoming games, etc. The layout information within the baseball theme could arrange the images in the shape of a baseball diamond in order to create a menu, which is both fun and baseball-related. Further, the layout information could require that the wireless device play the sound of a bat hitting a ball when the user navigates through each menu option. Further, the background of the wireless device's display could be layered with an image of the baseball team's home stadium. The end result would be a pervasive look and feel of the user interface that would be completely dedicated to the baseball team and would provide a pleasing user experience for a fan of the baseball team. One of skill in the art could devise other themes for different subject matter e.g. a fishing theme, a famous celebrity theme, a presidential election theme, etc.

Many similar themes may be bundled together in order to provide multiple choices to end users in one package, i.e., a theme bundle. For instance, a theme bundle could be based on country music artists, where each theme within the bundle would be dedicated to a particular country music artist. Another example would be a theme bundle based on European sports cars, where each theme within the bundle is dedicated to a particular car. Within each theme there could be assets and layout information related to the theme.

Themes may be deployed to the wireless device individually or within a theme bundle. In the case of a theme bundle, there can be one or more drawbacks to deploying all applicable themes within the theme bundle. First, the current state of theme deployment has the drawback of transmitting and storing themes in which the user is not interested. For example, in a theme bundle related to country music artists, the user may not be interested in every band's theme within the theme bundle. However, the only way the user can acquire a particular theme of interest may be to purchase the entire theme bundle which can result in the user acquiring many other themes that may not be desirable to the user. Receiving unwanted themes can result in wasted bandwidth during the transmission of those unwanted themes. Further, storing unwanted themes at a user device can result in wasted storage and other resources at the user device.

Second, all themes may be contained within a particular theme bundle at the time that the particular theme bundle is deployed to a user device. The themes within a particular theme bundle cannot be changed after the theme bundle is deployed to the user device. As such, new themes may be available for the wireless device but the only way for the user to obtain the new themes would require a redeployment of the complete theme bundle that includes the new themes. Redeployment of yet another theme bundle in order to obtain one or more new themes is, once again, inefficient due to bandwidth issues during transmission of the theme bundle over a network and storage issues at the user device after transmission.

Third, a particular theme deployed to a particular wireless device may be bound to that particular wireless device due to limitations placed on the device by a device manufacturer, a carrier network, a service provider, or a combination thereof. Accordingly, if a user upgrades to a new device and wants a theme that was previously contained in the old device, the user may have to obtain the desired theme or a bundle that includes the desired theme. In other words, the theme, or bundle, must be redeployed to the new device. This redeployment can involve additional charges to the user and can result in the consumption of additional bandwidth and the loss of storage at the new device. Further, having to redeploy the new theme bundle can be somewhat inconvenient to the user.

Finally, theme usage and theme activation cannot be tracked by the wireless network operator. Once a user of a particular wireless device acquires a theme or theme bundle at the user device, the user device may not have any need to contact the theme provider because all the theme assets and layout information are available at the user device without activation. The lack of contact can result in the wireless network operator not having any way to track the activation of themes. In addition, the wireless network operator cannot verify the digital rights associated with a particular theme, charge for the activation of the theme, or track usage. Further, a wireless network operator or service provider may not be able to generate additional revenue for access to premium themes or content. Premium themes or content, for example, can include one or more themes related to a movie that is about to released, a new album that is about to be released, or some other advanced dissemination of content that is available for a fee.

The disclosed system addresses the aforementioned shortcomings and allows wireless devices to acquire the themes the user actually desires through a theme box. Upon activation of a theme, the system could be capable of providing newly available content related to the activated theme. The system could also allow the activation of previously acquired themes on a new device. In addition, the system could enable operators to monitor theme activation.

Figure 1:
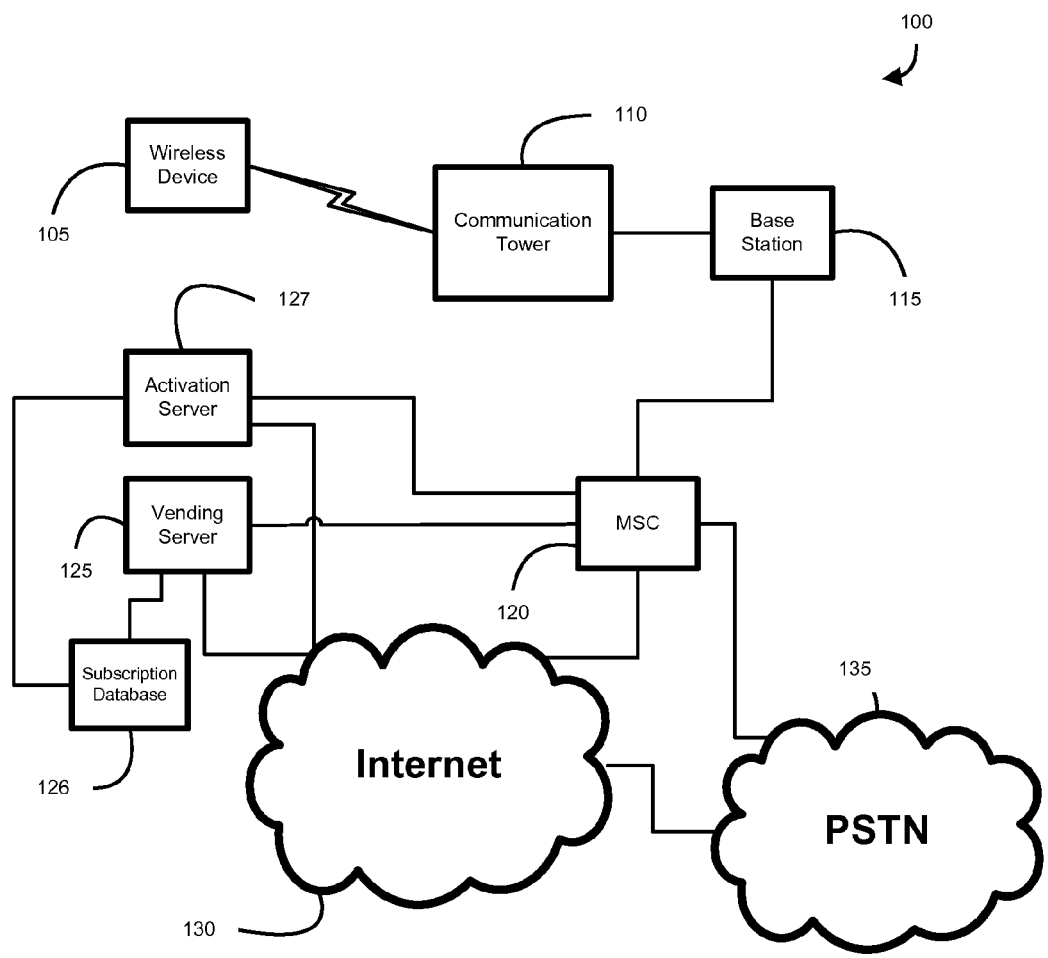
FIG. 1 is a diagram of a system for activating themes and content.

FIG. 1 depicts an exemplary communications network 100 for downloading and activating themes and content. The communication network 100 includes a wireless communications network, the public switched telephone network (PSTN) 135, and the Internet 130.

The wireless communications network includes a plurality of communication towers 110, each connected to a base station 115 and serving a plurality of wireless devices 105. A wireless device 105 can be a cellular telephone, a pager, a PDA, a laptop, or other portable electronic device capable of wirelessly communicating with other electronic devices. The wireless device 105 may be capable of storing themes and data related to theme activation such as usage information.

Data may be transmitted between the wireless device 105 and the communication tower 110. Communication between the wireless device 105 and the communication tower 110 can be based on different technologies, such as code division multiplexed access (CDMA), time division multiplexed access (TDMA), frequency division multiplexed access (FDMA), orthogonal frequency division multiplexed access (OFDMA), global system for mobile communications (GSM), or other technologies that may be used for the wireless communication. The data received by the communication tower 110 is sent to a base station 115 and then forwarded to a mobile switching center (MSC) 120, which is connected to the Internet 130 and the public switched telephone network (PSTN) 135. The Internet 130 is a high-speed data network.

A vending server 125 may be connected to the MSC 120 and the Internet 130. The vending server 125 may receive theme purchase requests from the wireless device 105. The vending server 125 is typically hosted by the wireless network operator but could be hosted by a third-party. The wireless network operator can be any company that owns or provides equipment used to provide over-the-air communication to and from wireless devices. The network operated by a wireless network operator can be a cellular network, a mobile network, any other wireless network, or a combination thereof. A third party can be a service provider that utilizes the network provided by the network operator to provide wireless services to and from various wireless devices.

The vending server 125 may process any billing transaction information prior to fulfilling the purchase request, for instance, by charging the wireless device's 105 billing account, receiving a credit card number, or by accepting a prepaid charge code. The vending server 125 may maintain a subscription database 126, which contains subscription and transaction information related to the wireless device's 105 purchase and activation of themes and content.

An activation server 127 may be connected to the MSC 120 and the Internet 130. The activation server 127 could be hosted by the operator or a third-party. The activation server 127 may receive notifications from the wireless device 105 when a particular theme is activated. The activation server 127 may interact with the subscription database 126 in order to verify that the wireless device 105 has sufficient rights to activate the theme. If the wireless device 105 does not have sufficient rights to activate the theme, the rights to activate the theme may be acquired through the vending server 125. Further, the activation server 127 may track usage information. In addition, the activation server 127 may present the wireless device 105 with a list of themes that are available for activation, a list of themes that are available for download and activation, or a combination thereof. The process of activating a theme is illustrated in more detail below in FIG. 3. In a particular aspect, the functionality provided by the vending server 125, the subscription database 126, and the activation server 127 can be provided by a single device, e.g., a single server.

Figure 2:
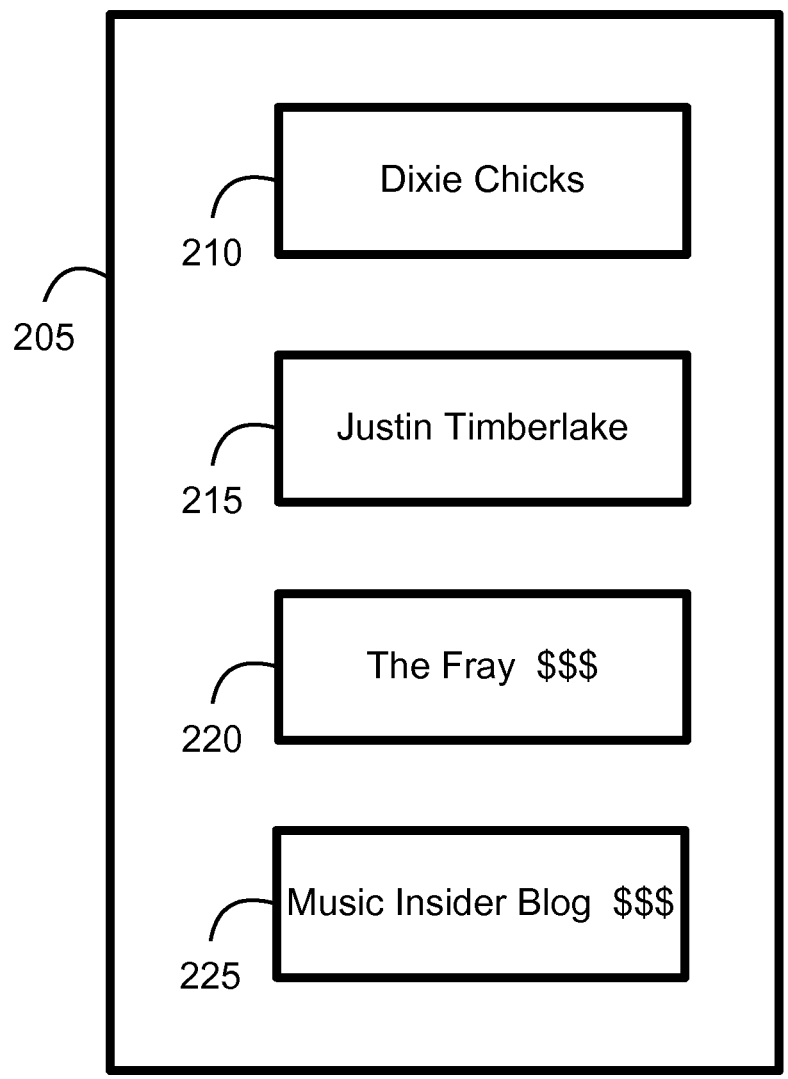
FIG. 2 is a block diagram depicting a theme box for downloading and activating themes.

FIG. 2 depicts a theme box application 205 executing on the wireless device 105. The theme box 205 could be accessible by selecting an icon presented at an idle screen, or home screen, on the wireless device 105. The theme box 205 may contain any number of themes, premium themes, content, or premium content. The term "theme box data" refers to data accessible via the theme box application 205, including themes, premium themes, content, and premium content. The exemplary theme box 205 shown in FIG. 2 contains a set of themes based on musical artists. The following themes are provided: Dixie Chicks 210, Justin Timberlake 215, and The Fray 220. In a particular aspect, the Dixie Chicks theme 210 and the Justin Timberlake theme 215 can be considered standard themes. Conversely, the Fray theme 220 can be considered a premium theme as denoted by the "$$$". The theme box 205 may also show premium content that is not a theme (e.g., video, music, news, wallpapers, ringtones, etc.). Premium themes and premium content may have an additional charge, user age requirement, and/or wireless device capability requirement, etc. in order to be activated. Such premium content may be available for download through the theme box 205. For instance, a Music Insider Blog 225 could be accessed for an additional fee as premium content. The Music Insider Blog 225 might have the latest stories on music groups and tour dates.

The theme box 205 may allow the wireless device 105 to select any theme for no additional charge, assuming the wireless device 105 has rights to activate the theme. Rights to access theme box data may be associated with the theme box 205. For instance, a soccer theme box may allow access to all soccer team themes.

Since premium themes or premium content may require an additional charge or subscription fee, they may be shown in a different font or color in order to notify the user that an additional charge may occur. For example, The Fray theme 220 is depicted with "$$$" to indicate that it is a premium theme. Likewise, the Music Insider Blog 225 is depicted with the "$$$" to indicate premium content.

The wireless device 105 may activate or acquire the theme using the keypad or buttons of the wireless device 105. The theme box 205 may also provide a scrollable selection icon for user interaction and theme activation. One of skill in the art could devise many user interface schemas to activate the themes, premium themes, and premium content within the theme box 205.

Figure 3:
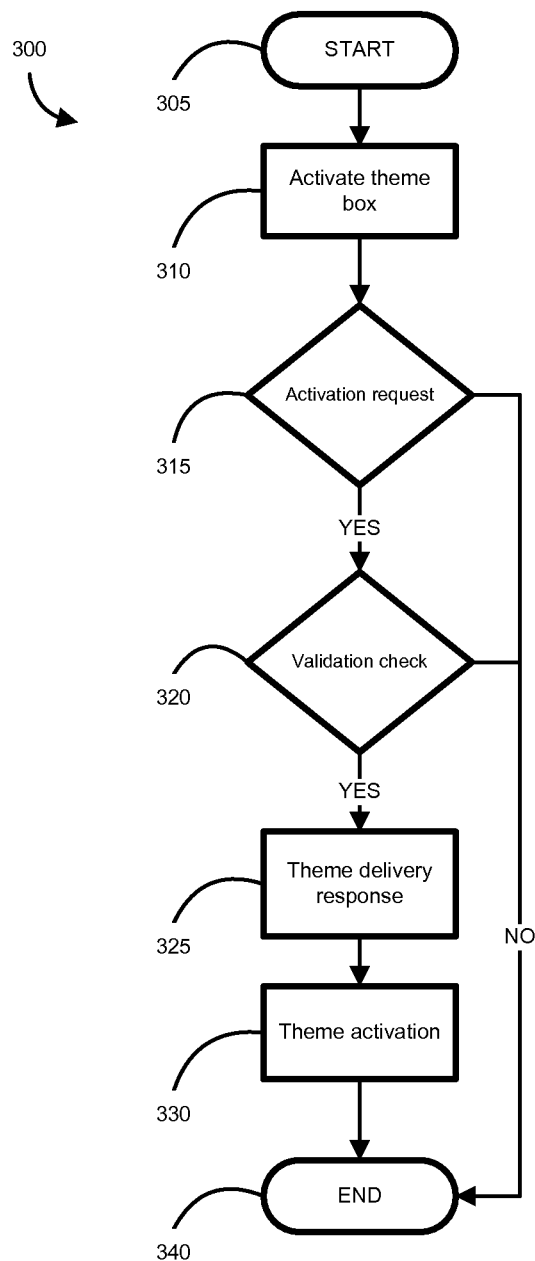
FIG. 3 is a flowchart illustrating the process of activating theme box data.

FIG. 3 is a flowchart which illustrates the process 300 of activating theme box data. The process 300 begins at START block 305. The theme box 205 may be preloaded on the wireless device 105 or may be downloaded to the wireless device 105. For instance, the wireless device 105 may purchase the theme box 205 through the vending server 125 for a flat fee, by subscription, or with a prepaid charge code. One of skill in the art could devise other methods of purchasing the theme box 205 from the vending server 125. Subscription and transaction information are stored in the subscription database 126. Once the wireless device 105 purchases the theme box 205, the wireless device 105 may have access to themes and be capable of purchasing premium themes and premium content, as previously discussed in FIG. 2.

Proceeding to block 310, the wireless device 105 activates the theme box 205. The activation server 127 can receive an indication that the theme box 205 is activated. Further, the activation server 127 may update a list of available theme box data such that the wireless device 105 has a view similar to that of FIG. 2. The list of available theme box data may be tailored to the wireless device 105 based on usage data gathered by the activation server 127 and the vending server 125. The usage data can include how many times a particular theme is downloaded, how many times a particular theme is activated, how many times a particular theme is downloaded without being activated, how many times a particular theme is downloaded and activated, how many times a particular theme is deactivated, or a combination thereof.

In another aspect, the list of available theme box data may be tailored to the wireless device 105 based on the wireless device's 105 capabilities (e.g., screen size, processor speed, memory, etc.). For instance, the wireless device 105 may transmit its capabilities prior to requesting the list of available theme box data. Alternatively, the activation server 127 may have the capabilities of the wireless device 105 already stored in memory or accessible via another server. One of skill in the art could devise alternative methods of tailoring the available theme box data viewable through the theme box 205 without departing from the scope and spirit of this disclosure. The theme box data can also include tracking information that can be configured to allow a theme box data creator, a carrier network, a service provider, or a combination thereof to track download and activation of the theme box data. The tracking information can also be configured to allow the theme box data creator, the carrier network, the service provider, or a combination thereof to provide updates to the theme box data after the theme box data is activated.

Proceeding to block 315, the wireless device 105 receives an activation request to activate theme box data. The activation request may be transmitted to the activation server 127, where the activation request may be stored as usage data for marketing or sales research. For instance, at a later time, the wireless network operator may perform marketing analysis on the usage data in order to determine which theme box data is popular or unpopular in order to increase theme box data monetization.

If the wireless device 105 does not attempt to activate theme box data, then the process 300 proceeds along the NO branch to the END block 340 where the process 300 terminates. In the NO case, the current theme box data activated on the wireless device 105 remains active and no new theme box data is activated through the theme box 205 at that time. Alternatively, if the wireless device 105 attempts to activate theme box data, the process 300 proceeds along the YES branch to block 320.

At block 320, the activation server 127 performs a validation check in order to determine that the theme box 205 has access to the theme box data which is requested to be activated in block 310. The activation server 127 may use the subscription database 126 in order to perform the validation check. The validation check could be based on any number of criteria such as the account class of the wireless device 105 (e.g., enterprise or consumer), age appropriateness of the theme box data, available funds in the wireless device's 105 account, the wireless device's 105 subscription plan, promotions offered by the wireless network operator, etc. Since the wireless operator knows the needs of its customers, the wireless operator may have its own unique criteria for the validation check. For instance, the validation check may verify that the wireless device 105 has a paid subscription to the theme box data.

In one embodiment, the activation request may be valid by virtue of its relationship with a theme box 205 that has a valid subscription in the subscription database 126 (e.g., a football theme box could have valid access to all football team themes). Should the validation check fail, the wireless device 105 may be presented with the option of purchasing a subscription. The vending server 125 may be used to present the wireless device 105 with the option of purchasing the subscription. Alternatively, the wireless device 105 may need to purchase a subscription to the theme box 205 again.

In one embodiment, the validation check of block 320 and the updating of the theme box's list in block 310 could be combined such that the wireless device 105 only receives a list of theme box data to which the wireless device 105 has access.

Successful and unsuccessful validation checks may be stored on the activation server 127 for later analysis. If validation check is not successful, the process 300 proceeds along the NO branch to END block 340 where the process 300 terminates. In the NO case, the user may be notified that the activation process has failed and optionally be presented the option of re-subscribing. Alternatively, if the validation check is successful, the process 300 proceeds along the YES branch to block 325.

At block 325, the activation server 127 responds to the wireless device's 105 activation request by either transmitting to the wireless device 105 an authorization to activate the theme box data or by transmitting the theme box data to the wireless device 105. If the theme box data already exists on the wireless device 105, the activation server 127 may only need to provide the authorization. However, the wireless device 105 may not have the theme box data resident in memory; therefore, the theme box data will need to be downloaded to the wireless device 105.

The wireless device 105 might need to download the theme box data because the wireless device 105 has never activated the theme box data before. Alternatively, the wireless device 105 may have activated the theme box data previously, but the theme box data may have been deleted from the wireless device 105 to release memory. In another situation, the activated theme box data may have changed since last activation thus requiring the theme box data to be downloaded to the wireless device 105 again. In one embodiment, when new theme box data is available upon activation, only the difference between the new theme box data and the old theme box data is downloaded.

In addition, the user might have purchased a new wireless device 105 such that the theme box data has never been in memory on the new wireless device 105. Assuming the user has a valid subscription to the theme box data via the theme box 205, the theme box data will need to be redistributed to the new wireless device 105 through the theme box 205. In the case of a new wireless device 105, the theme box 205 may need to be downloaded again unless it is preinstalled on the new wireless device 105.

The activation server 127 may wait for a delivery acknowledgement prior to finalizing the activation request. Upon successful receipt, by the wireless device 105, of the authorization or the theme box data, the process 300 proceeds to block 330.

At block 330, the wireless device 105 activates the theme box data. The wireless device 105 may exit the theme box 205 and return the wireless device 105 to a homescreen. A newly activated theme's look and feel may be shown on the icons, wallpaper, and layout. For instance, if the Dixie Chicks 210 theme from FIG. 2 were activated, the main wallpaper might show a picture of the band members and the homescreen icons may contain links to tour dates and shortcuts to the music-related features of the wireless device 105.

If content such as a ringtone, song, wallpaper, or blog were selected, the wireless device 105 may present options to the user such that the user can interact with the newly downloaded content. The process 300 proceeds to block 340 where the process 300 terminates.

FIG. 4 illustrates an exemplary, non-limiting theme that is generally designated 400. As shown, the theme 400 can include at least one asset 402 and layout information 404. As stated herein, at least one asset 402 can include any one of the following: music, images, video, other multimedia data, or a combination thereof. Further, the at least one asset 402 can include be any combination of music, images, video, and other multimedia data. For instance, a theme based on a rock band could contain images of band members, tour dates, songs, or any combination thereof. The layout information 404, as previously stated, can indicate how each of the at least one asset 402 appears or operates on a wireless device. Table 1, below, indicates exemplary, non-limiting layout information.

TABLE 1

Exemplary Layout Information (Baseball Theme).

| Theme | Baseball-San Diego Padres |
|---|---|
| Theme Title Bar | San Diego Padres |
| Theme Menu | Baseball Diamond (Image of Petco Park) |
| Theme Softkeys | Roster Softkey-Home Plate |
| | Songs Softkey-First Base |
| | Schedule Softkey-Second Base |
| | Stats Softkey-Third Base |
| | Home Softkey-Bottom Left |
| | Select Softkey-Bottom Right |
| Sub Page 1 | Roster-From Roster Softkey |
| | Select Softkey-Bottom Left |
| | Home Softkey-Bottom Right |
| Sub Page 2 | Songs-From Songs Softkey |
| Sub Page 3 | Schedule-From Songs Softkey |
| Sub Page 4 | Stats-From Stats Softkey |
| Sub Page 5-N | Player Information-From Roster |
| | Profile Softkey-Bottom Left |
| | Stats Softkey-Bottom Right |
| Sound 1 | Bat Crack During Softkey Press/Navigation |
| Sound 2-N | Other Baseball Sounds (Crowd Noise, Stadium Organ Music, etc.) |

Figure 7:
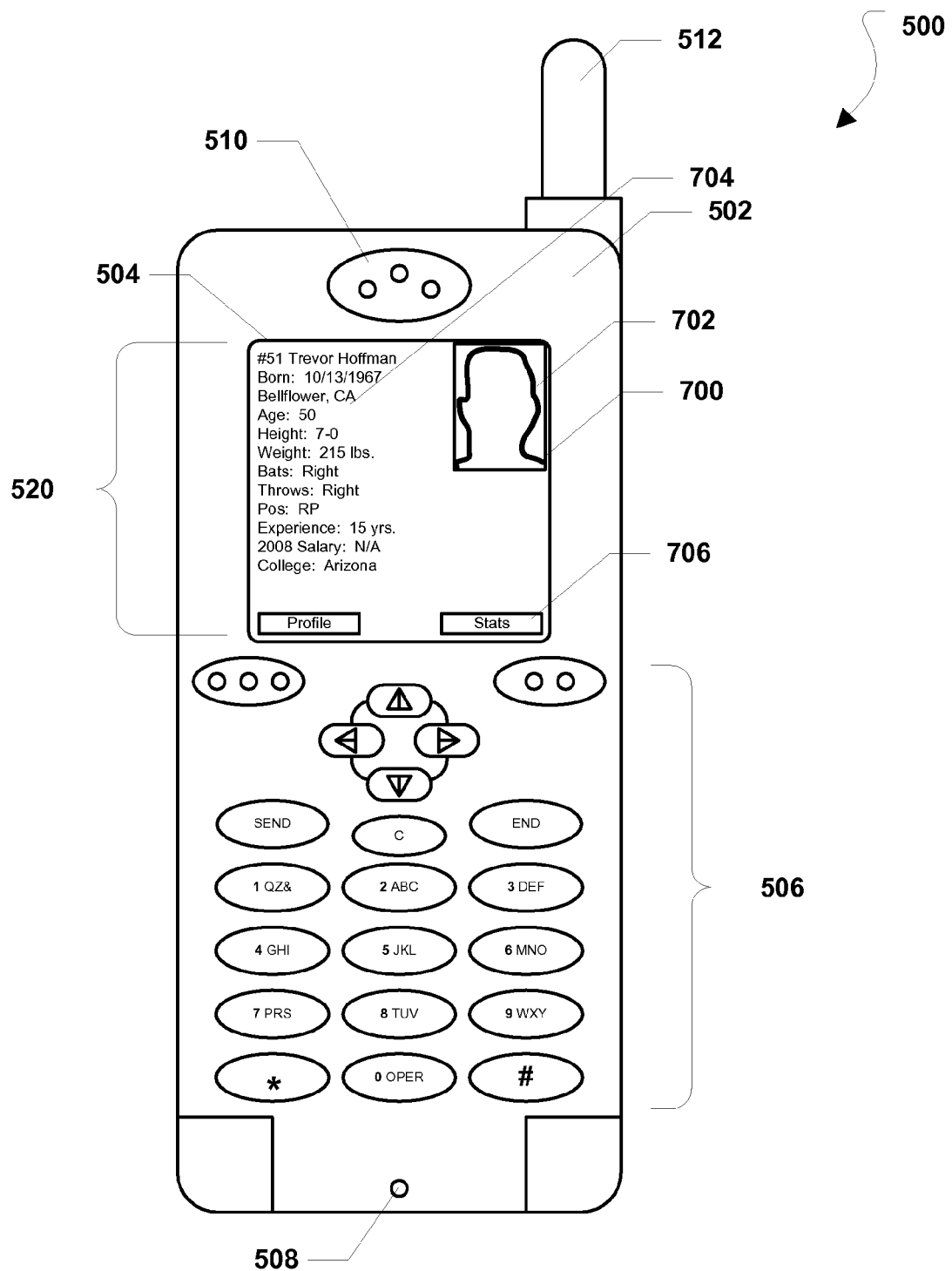
FIG. 7 is a yet another plan view of the wireless device depicting yet another aspect of the exemplary theme.

Referring now to FIG. 5 through FIG. 7, an exemplary, non-limiting wireless device is shown and is generally designated 500. As illustrated in FIG. 5, the wireless device 500 can include a housing 502. A display 504 can be incorporated in the housing 502. The display 504 can be a liquid crystal display (LCD), an organic light emitting diode (OLED) display, or some other type of display well known in the art. The wireless device 500 can further include a keypad 506 incorporated into the housing 502. Further, the wireless device 500 can include a microphone 508 and a speaker 510. Also, the wireless device 500 can include an antenna 512 that can extend from the housing 502.

In a particular aspect, as illustrated in FIG. 5 through FIG. 7, the wireless device 500 can include a theme 520. The theme 520 illustrated in FIG. 5 is a baseball theme. FIG. 5 indicates that the theme 520 can include a main page 522 that can include a theme title bar 524 and a theme menu 526. The theme title bar 524 can indicate the title of the theme, e.g., San Diego Padres. Further, in line with the baseball theme, the theme menu 526 can be in the shape of a baseball diamond. Also, the theme menu 526 can include one or more theme softkeys 528. In the example illustrated, the theme softkeys 528 can include a roster softkey, a songs softkey, a schedule softkey, and a stats softkey. The theme menu 526 can also include a home softkey 530 and a select softkey 532.

FIG. 6 and FIG. 7 indicate that the theme 520 can include a plurality of sub pages. FIG. 6, for example, illustrates a first sub page 600 that can be accessed via the theme menu 526. For example, when a user selects the roster softkey from the selection of theme softkeys 528 presented at the theme menu 526, the user can be presented with the first sub page 600 that illustrates a roster of players associated with the team associated with the baseball theme, i.e., the San Diego Padres. The first sub page 600 can include a first sub page title bar 602 and first sub page content 604. The first sub page title bar 602 can indicate that the title of the sub page is "San Diego Padres—Roster". Further, the first sub page content 604 can indicate the all or a portion of the roster of the San Diego Padres. The first sub page 600 can also include a plurality of first sub page softkeys 606 and a first sub page scroll bar 608. In the example shown, the first sub page softkeys 606 can include a select softkey, and a home softkey. Alternately, the softkeys 606 can include a back softkey, a next softkey, or another softkey. The first sub page scroll bar 608 and the first sub page softkeys 606 can be used to select a player from the roster provided by the first sub page content 604 or to navigate between the main page and the second sub page illustrated in FIG. 7.

FIG. 7 depicts a second sub page 700 that can be accessed from the first sub page 600. In the example illustrated, the second sub page 700 can be accessed by selecting an item from the first sub page content 604 illustrated in FIG. 6, e.g., a particular player. As shown, the second sub page 700 can include an image 702, e.g., a photo of the selected player. Further, the second sub page 700 can include second sub page content 704, e.g., details about the selected player. Also, the second sub page 700 can include a plurality of second sub page softkeys 706 that can lead to additional sub pages associated with an item of interest, e.g., the selected player. For example, the second sub page softkeys 706 can include a profile softkey and a stats softkey. Alternatively, the second sub page softkeys 706 can include one or more of the following: a splits softkey, a gamelog softkey, a bat v. pitch softkey, a news softkey, a scouting softkey, and a fantasy softkey. A user can see additional information regarding the selected player by choosing from the second sub page softkeys 706.

With the configuration described herein, a user can activate a theme box at a wireless device. The theme box can provide a list of available theme box data and the user can choose a single theme from the list of available theme box data. Accordingly, the user does not need to download a bundle of themes in order to get a desired theme. As such, bandwidth usage over a network and memory storage at a wireless device can be substantially minimized.

After a particular theme is downloaded and activated at a wireless device, the theme box can periodically search for updates to the theme. As updates to the theme are available the theme box can retrieve the updates and add those updates to the activated theme. As such, a user does not need to download an entire theme in order to obtain just the desired updates. Again, bandwidth and storage can be substantially minimized. Moreover, when a user upgrades to a new wireless device a previously downloaded and activated theme can be provided to the new wireless device without any additional cost to the user. In other words, the ability of the theme box to communicate with an activation server or a vending server can provide a way to track which themes have been previously downloaded and activated on particular devices. As such, entire theme bundles need not be provided to the new device—only the previously downloaded and upgraded theme bundles can be redeployed to the new user device.

Additionally, the theme box can periodically communicate with an activation server and provide a mechanism by which the activation server, or some other server, can track usage of the theme. The server can track themes as they are downloaded, activated, deactivated, etc. Particular themes that fall below certain thresholds for download or activation can be removed from lists of available theme box data that are provided to users via the theme box.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any tangible medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. For example, a computer-readable medium can be a memory within a wireless device or a memory within a server.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected embodiments have been illustrated and described in detail, it will be understood that various substitutions and alterations can be made therein without departing from the spirit and scope of the present invention, as defined by the following claims. One or more of the method steps described herein can be executed by a processor. Further, a processor can serve as a means for performing the various method steps described herein. It is to be understood that the order that the method steps are executed, as disclosed herein, is simply exemplary and in various aspects the method steps may be performed in any reasonable order.

What is claimed is:

1. A method of activating theme box data on a wireless device, the method comprising:
    activating a theme box at the wireless device;
    transmitting, from the wireless device to an activation server, information describing at least one capability of the wireless device;
    receiving a list of available theme box data at the theme box, wherein the list is based at least partially on the at least one capability of the wireless device, and wherein the theme box data includes at least one of at least one asset and layout information that describes a presentation of the at least one asset on the wireless device;
    selecting the theme box data for activation from the list of available theme box data;
    transmitting, from the wireless device to an the activation server, an activation request to activate the theme box data, wherein the activation request comprises a request for validation that the theme box has access to the theme box data;
    automatically receiving from the activation server, at the wireless device, an authorization signal to activate the theme box data; and
    activating the theme box data on the wireless device.

2. The method of claim 1, further comprising receiving the theme box data, in the event the theme box data is not on the wireless device.

3. The method of claim 2, further comprising receiving a portion of the theme box data, wherein the portion of the theme box data comprises a difference between new theme box data not on the wireless device and old theme box data on the wireless device.

4. The method of claim 1, wherein the layout information is bundled with at least one asset within the theme box data.

5. The method of claim 1, further comprising using existing layout information to define a presentation of the at least one asset.

6. The method of claim 1, wherein the list of available theme box data comprises premium content, standard content, or a combination thereof.

7. The method of claim 6, wherein the premium content appears differently on the list of available theme box data.

8. The method of claim 1, wherein receiving the authorization signal to activate the theme box data indicates a valid subscription to the theme box data.

9. The method of claim 1, wherein the theme box data provides instant navigation to a picture album, an address book, a video conferencing application, an email client, a web browser, a game, stock quotes, sports scores, or a combination thereof.

10. The method of claim 1, further comprising receiving newly available content related to an activated theme.

11. The method of claim 1, wherein the theme box data includes tracking information configured to allow a theme box data creator, a carrier network, a service provider, or a combination thereof to track download and activation of the theme box data.

12. A wireless device, comprising:
    means for activating a theme box at the wireless device;
    means for transmitting, to an activation server, information describing at least one capability of the wireless device;
    means for receiving a list of available theme box data at the theme box, wherein the list is based at least partially on the at least one capability of the wireless device, and wherein the theme box data includes at least one of at least one asset and layout information that describes a presentation of the at least one asset on the wireless device;

means for selecting the theme box data for activation from the list of available theme box data;

means for transmitting to an the activation server an activation request to activate the theme box data, wherein the activation request comprises a request for validation that the theme box has access to the theme box data;

means for automatically receiving from the activation server an authorization signal to activate the theme box data; and means for activating the theme box data on the wireless device.

13. The wireless device of claim 12, further comprising means for receiving the theme box data, in the event the theme box data is not on the wireless device.

14. The wireless device of claim 12, further comprising means for receiving a portion of the theme box data, wherein the portion of the theme box data comprises a difference between new theme box data not on the wireless device and old theme box data on the wireless device.

15. The wireless device of claim 12, wherein the theme box data includes tracking information configured to allow a theme box data creator, a carrier network, a service provider, or a combination thereof to track download and activation of the theme box data.

16. The wireless device of claim 14, further comprising means for using existing layout information to define a presentation of the at least one asset.

17. The wireless device of claim 12, wherein the list of available theme box data comprises premium content, standard content, or a combination thereof and wherein the premium content appears different from the standard content.

18. The wireless device of claim 12, further comprising means for receiving newly available content related to an activated theme.

19. A non-transitory computer readable medium having stored thereon executable instructions configured to cause a processor of a wireless device to perform operations comprising:

activating a theme box at the wireless device;

transmitting, to an activation server, information describing at least one capability of the wireless device;

receiving a list of available theme box data at the theme box, wherein the list is based at least partially on the at least one capability of the wireless device, and wherein the theme box data includes at least one of at least one asset and layout information that describes a presentation of the at least one asset on the wireless device;

selecting the theme box data for activation from the list of available theme box data;

transmitting, from the wireless device to an the activation server, an activation request to activate the theme box data;

receiving from the activation server, at the wireless device, an authorization signal to activate the theme box data, wherein the activation request comprises a request for validation that the theme box has access to the theme box data; and automatically activating the theme box data on the wireless device.

20. The non-transitory computer readable medium of claim 19 having stored thereon executable instructions configured to cause a processor of a wireless device to perform operations further comprising:

receiving the theme box data, in the event the theme box data is not on the wireless device.

21. The non-transitory computer readable medium of claim 19 having stored thereon instructions configured to cause a processor of a wireless device to perform operations further comprising:

receiving newly available content related to an activated theme.

22. The non-transitory processor of a wireless device readable medium of claim 19, wherein the theme box data includes tracking information configured to allow a theme box data creator, a carrier network, a service provider, or a combination thereof to track download and activation of the theme box data.

23. The non-transitory processor of a wireless device readable medium of claim 19, wherein the list of available theme box data comprises premium content, standard content, or a combination thereof and wherein the premium content appears different from the standard content.

24. A method of processing theme box data on a server, the method comprising:

receiving an indication that a theme box is activated at a wireless device;

receiving, from the wireless device, information describing at least one capability of the wireless device;

transmitting a list of available theme box data to the wireless device, wherein the list is based at least partially on the received information describing at least one capability of the wireless device, and wherein the theme box data includes at least one of at least one asset and layout information that describes a presentation of the at least one asset on the wireless device;

receiving an activation request from the wireless device to activate the theme box data, wherein the activation request comprises a request for validation that the theme box has access to the theme box data;

performing a validation check on the activation request; and automatically transmitting to the wireless device an authorization signal to activate the theme box data.

25. The method of claim 24, further comprising transmitting the theme box data to the wireless device in the event the theme box data is not on the wireless device.

26. The method of claim 24, wherein the at least one capability comprises a screen size, a processor speed, an available memory, or a combination thereof.

27. The method of claim 24, further comprising storing the at least one capability received from the wireless device.

28. The method of claim 24, further comprising gathering usage data associated with theme box data and tailoring the list of available theme box data at least partially based on the usage data.

29. The method of claim 24, further comprising checking if the wireless device is associated with a subscription to activate the theme box data.

30. The method of claim 24, wherein the list of available theme box data comprises premium content, standard content, or a combination thereof.

31. The method of claim 30, further comprising receiving payment for premium content.

32. A server, comprising:

means for receiving an indication that a theme box is activated at a wireless device;

means for receiving, from the wireless device, information describing at least one capability of the wireless device;

means for transmitting a list of available theme box data to the wireless device, wherein the list is based at least partially on the received information describing at least one capability of the wireless device, and wherein the theme box data includes at least one of at least one asset and layout information that describes a presentation of the at least one asset on the wireless device;

means for receiving an activation request from the wireless device to activate the theme box data, wherein the activation request comprises a request for validation that the theme box has access to the theme box data;

means for performing a validation check on the activation request; and means for automatically transmitting to the wireless device an authorization signal to activate the theme box data.

33. The server of claim 32, further comprising means for transmitting the theme box data to the wireless device in the event the theme box data is not on the wireless device.

34. The server of claim 32, wherein the at least one capability comprises a screen size, a processor speed, an available memory, or a combination thereof.

35. The server of claim 32, further comprising means for storing the at least one capability received from the wireless device.

36. The server of claim 32, further comprising means for gathering usage data associated with theme box data and means for tailoring the list of available theme box data at least partially based on the usage data.

37. The server of claim 32, further comprising means for checking if the wireless device is associated with a subscription to activate the theme box data.

38. The server of claim 32, wherein the list of available theme box data comprises premium content, standard content, or a combination thereof.

39. The server of claim 38, further comprising means for receiving payment for premium content.

40. A non-transitory computer readable medium having stored thereon instructions configured to cause a computer to perform operations, comprising:

receiving an indication that a theme box is activated at a wireless device;

receiving, from the wireless device, information describing at least one capability of the wireless device;

transmitting a list of available theme box data to the wireless device, wherein the list is based at least partially on the received information describing at least one capability of the wireless device, and wherein the theme box data includes at least one of at least one asset and layout information that describes a presentation of the at least one asset on the wireless device;

receiving an activation request from the wireless device to activate the theme box data, wherein the activation request comprises a request for validation that the theme box has access to the theme box data;

performing a validation check on the activation request; and automatically transmitting to the wireless device an authorization signal to activate the theme box data.

41. The non-transitory computer readable medium of claim 40 having stored thereon instructions configured to cause a computer to perform operations further comprising:

transmitting the theme box data to the wireless device in the event the theme box data is not on the wireless device.

42. The non-transitory computer readable medium of claim 40 wherein the at least one capability comprises a screen size, a processor speed, an available memory, or a combination thereof.

43. The non-transitory computer readable medium of claim 40 having stored thereon instructions configured to cause a computer to perform operations further comprising:

storing the at least one capability received from the wireless device.

44. The non-transitory computer readable medium of claim 40 having stored thereon instructions configured to cause a computer to perform operations further comprising:

gathering usage data associated with theme box data and at least one instruction for tailoring the list of available theme box data at least partially based on the usage data.

45. The non-transitory computer readable medium of claim 40 having stored thereon instructions configured to cause a computer to perform operations further comprising:

checking if the wireless device is associated with a subscription to activate the theme box data.

46. The non-transitory computer readable medium of claim 40, wherein the list of available theme box data comprises premium content, standard content, or a combination thereof.

47. The non-transitory computer readable medium of claim 46 having stored thereon instructions configured to cause a computer to perform operations further comprising:

receiving payment for premium content.

48. The non-transitory computer readable medium of claim 41 having stored thereon instructions configured to cause a processor of a wireless device to perform operations further comprising:

receiving a portion of the theme box data, wherein the portion of the theme box data comprises a difference between new theme box data not on the wireless device and old theme box data on the wireless device.

49. The non-transitory computer readable medium of claim 48 having stored thereon instructions configured to cause a processor of a wireless device to perform operations further comprising:

using existing layout information to define a presentation of the at least one asset.

50. A wireless device, comprising:

a processor;

a memory accessible to the processor; and a theme box stored within the memory and executable by the processor, wherein the theme box is configured to receive a list of available theme box data upon activation of the theme box at the wireless device, wherein the list of available theme box data includes premium content, standard content, or a combination thereof, wherein the list is based at least partially on at least one capability of the wireless device, and wherein the theme box data includes at least one of at least one asset and layout information that describes a presentation of the at least one asset on the wireless device, wherein the theme box is further configured to:

transmit, to an activation server, information describing at least one capability of the wireless device;

transmit, to the activation server, an activation request to activate selected theme box data from the list of available theme box data, wherein the activation request comprises a request for validation that the theme box has access to the theme box data; and automatically receive from the activation server an authorization signal to activate selected theme box data and to activate the selected theme at the wireless device.

51. The wireless device of claim 50, wherein the theme box is configured to receive a portion of the selected theme box data, wherein the portion of the selected theme box data comprises a difference between new theme box data not on the wireless device and old theme box data on the wireless device.

52. A server, comprising:
- a processor; and
- a memory accessible to the processor, wherein the memory comprises:
  - at least one instruction for receiving an indication that a theme box is activated at a wireless device;
  - at least one instruction for receiving, from the wireless device, information describing at least one capability of the wireless device;
  - at least one instruction for transmitting a list of available theme box data to the wireless device, wherein the list is based at least in part on the received information describing at least one capability of the wireless device, and wherein the theme box data includes at least one of at least one asset and layout information that describes a presentation of the at least one asset on the wireless device;
  - at least one instruction for receiving an activation request from the wireless device to activate the theme box data, wherein the activation request comprises a request for validation that the theme box has access to the theme box data;
  - at least one instruction for performing a validation check on the activation request; and
  - at least one instruction for automatically transmitting to the wireless device an authorization signal to activate the theme box data.

53. The server of claim 52, wherein the memory further comprises at least one instruction for transmitting the theme box data to the wireless device in the event the theme box data is not on the wireless device.

54. The server of claim 52, wherein the memory further comprises at least one instruction for gathering usage data associated with theme box data and at least one instruction for tailoring the list of available theme box data at least partially based on the usage data.

* * * * *